United States Patent
Yoshida et al.

(10) Patent No.: US 7,483,427 B2
(45) Date of Patent: Jan. 27, 2009

(54) DATA DRIVEN TYPE INFORMATION PROCESSING APPARATUS AND METHOD OF INCREASING TRANSFER SPEED OF DATA PACKET

(75) Inventors: Shinichi Yoshida, Nara (JP); Tsuyoshi Muramatsu, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 549 days.

(21) Appl. No.: 11/052,901

(22) Filed: Feb. 9, 2005

(65) Prior Publication Data
US 2005/0175011 A1    Aug. 11, 2005

(30) Foreign Application Priority Data
Feb. 10, 2004    (JP) .............................. 2004-033864

(51) Int. Cl.
*H04L 12/28* (2006.01)
(52) U.S. Cl. ....................... 370/392; 709/232
(58) Field of Classification Search .................. None
See application file for complete search history.

(56) References Cited

U.S. PATENT DOCUMENTS

| | | | |
|---|---|---|---|
| 4,881,196 A | 11/1989 | Terada et al. | |
| 5,511,215 A * | 4/1996 | Terasaka et al. | 712/25 |
| 5,636,221 A * | 6/1997 | Kanekura | 370/388 |
| 5,794,064 A * | 8/1998 | Yoshida et al. | 712/25 |
| 6,157,967 A * | 12/2000 | Horst et al. | 710/19 |
| 6,674,750 B1 * | 1/2004 | Castellano | 370/354 |
| 6,823,443 B2 * | 11/2004 | Horiyama et al. | 712/201 |
| 6,898,276 B1 * | 5/2005 | Millet et al. | 379/219 |
| 7,082,515 B2 * | 7/2006 | Arakawa et al. | 712/25 |
| 2005/0078696 A1 * | 4/2005 | Oner | 370/419 |

FOREIGN PATENT DOCUMENTS

| | | |
|---|---|---|
| JP | 62-009450 A | 1/1987 |
| JP | 2001-331472 A | 11/2001 |

* cited by examiner

*Primary Examiner*—Phirin Sam
(74) *Attorney, Agent, or Firm*—Birch, Stewart, Kolasch & Birch, LLP

(57) ABSTRACT

A branching control unit includes a logic gate and a NAND circuit that can receive transfer permission for each branching designation. The branching control unit further includes a transfer request unit receiving respective outputs of the logic gate and NAND circuit. The transfer request unit sends a data transfer request to a branching designation when the logic gate or NAND circuit is rendered active. Since transfer permission can be received for each branching designation to send a transfer request, a data waiting state depending upon the data holding state of another branching destination will no longer occur. Thus, a data driven type information processing apparatus and method of transferring a data packet at higher speed in a data transmission path can be provided.

6 Claims, 14 Drawing Sheets

F1: DESTINATION NODE NUMBER FIELD
F2: GENERATION NUMBER FIELD
F3: INSTRUCTION CODE FIELD
F4: DATA FIELD

DATA DRIVEN TYPE INFORMATION PROCESSING APPARATUS AND METHOD OF INCREASING TRANSFER SPEED OF DATA PACKET

This nonprovisional application is based on Japanese Patent Application No. 2004-033864, the entire contents of which are hereby incorporated by reference.

BACKGROUND OF THE INVENTION

1. Field of the Invention

The present invention relates to a data driven type information processing apparatus and method. More particularly, the present invention relates to a configuration of a branching unit including a self-synchronous transfer control circuit and a data transfer control method.

2. Description of the Background Art

Multi-media data processing that contains images requires a large amount of data to be processed at high speed. Particularly, the need arises for high-speed execution of a large amount of operations in image processing. A data driven type information processing apparatus is proposed as a processor accommodating such needs.

A data driven type information processing apparatus executes a process only after all the input data required for a certain process are available and resources such as a processing unit required for that process has been allocated.

For example, a data transfer apparatus employing an asynchronous handshake method is used as a data driven type information processing apparatus. This handshaking method employed in a data driven type information processing apparatus is one method of data transfer for conducting data transfer autonomously by transmitting/receiving a transfer request signal requesting data transfer and a transfer permission signal indicating whether data transfer is permitted or not between circuit blocks to transfer data (referred to as "data transmission path" hereinafter). The transfer request signal is referred to as a "SEND" signal, and a transfer permission signal is referred to as an "ACK" signal, hereinafter.

The operation of a data driven type information processing apparatus is disclosed in, for example, Japanese Patent Laying-Open No. 2001-331472. The data driven type information processing apparatus disclosed in this publication will be described hereinafter.

FIG. 7 represents a configuration of a data packet applied conventionally and in the present invention.

Referring to FIG. 7, a data packet DP includes a destination node number field F1 storing a destination node number ND#, a generation number field F2 storing a generation number GN#, an instruction code field F3 storing an instruction code OPC, and a data-field F4 storing data DATA.

The generation number serves to identify data groups that are processed in parallel from each other. The destination node number serves to identify input data with the same generation number from each other. The instruction code serves to indicate the instruction to be applied on the data.

FIG. 8 represents a configuration of a data transmission path.

Referring to FIG. 8, a data transmission path 100 includes a self-synchronous type transfer control circuit (referred to as "C element" hereinafter) 101A, and a data holding circuit formed of a D type flip-flop (referred to as "pipeline register" hereinafter). The meaning of "self-synchronous" will be described in detail afterwards.

Upon receiving a SEND signal from an input node CI, C element 101A provides an ACK signal from an output node RO. C element 101A also provides a SEND signal from output node CO, and receives an ACK signal at an input node RI. The operation and configuration of C element 101A will be described afterwards.

Pipeline register 101B receives a clock pulse provided from an output node CP of C element 101A to input and output a data packet.

FIG. 9 is a waveform diagram of signals input to and output from respective nodes of C element 101A of FIG. 8.

At time t1-t3, the SEND signal applied to input node CI attains an L level (logical low), whereby C element 101A receives a data packet transfer request. At time t2, C element 101A pulls down the ACK signal output from output node RO to an L level to inhibit reception of an additional data packet.

When the SEND signal applied to input node CI attains an H level (logical high) at time t3, input of a data packet to pipeline register 101B of FIG. 8 is completed. At time t4, the ACK signal from output node RO attains an H level indicating that data packet transfer is permitted, whereby C element 101A allows input of a data packet again.

At time t5, C element 101A pulls down the SEND signal that is to be output from output node CO to an L level to request transfer of a data packet, whereby output of the data packet is initiated.

When the clock pulse from output node CP is switched to an L level at time t7, the SEND signal from output node CO attains an H level at time t8. Thus, an output operation of a data packet ends.

As described above, data transfer control carried out in an asynchronous manner with at least a preset delay time in accordance with signals SEND and ACK is referred to as "self-synchronous transfer control", and a circuit that conducts self-synchronous transfer control is referred to as "self-synchronous transfer control circuit".

FIG. 10 represents an application of a data transmission path in a data driven type information processing apparatus.

Referring to FIG. 10, a data packet is sequentially transferred from pipeline register 104A to pipeline registers 104B and 104C. During such transfer, the data packet is processed by logic circuits 103A and 103B.

A data packet is not transmitted from pipeline register 104A to pipeline register 104B during the period of time pipeline register 104B retains a data packet. In the event of pipeline register 104B not retaining a data packet or just at the stage of data packet output, a data packet is transferred from pipeline register 104A to logic circuit 103A, and then to pipeline register 104B.

FIG. 11 represents a specific circuit configuration of C element 101A. Referring to FIG. 11, C element 101A includes a flip-flop 105A, an inverter 105G inverting the signal provided from an output Q of flip-flop 105A, and a flip-flop 105B providing a signal from an output node CP via a delay circuit 105E when set, and providing a signal from an output node CO when reset.

Flip-flop 105A is set upon receiving a SEND signal of an L level from the C element of the preceding stage not shown to provide a signal from output Q. The output signal is inverted by inverter 105G to become the ACK signal towards the C element of the preceding stage.

Flip-flop 105B is set upon receiving a signal of an L level from a NAND circuit 105C. When flip-flop 105B is set, a signal is provided from output node CP. The output signal from output node CP functions as a control signal of data output with respect to the pipeline register of a succeeding stage. When flip-flop 105B is reset, a signal is provided from output node CO, which becomes the SEND signal towards the C element of the succeeding stage.

NAND circuit 105C receives the SEND signal from the C element of the preceding stage through input node CI, and the ACK signal from the C element of the succeeding stage through input node RI. Furthermore, NAND circuit 105C receives a signal that is output when flip-flop 105B is reset, and a signal from output Q of flip-flop 105A.

FIG. 12 is a block diagram of a 2-input 2-output type router employed in a data driven type information processing apparatus of prior art and the present invention. A router is a device employed in the transfer of a data packet between processing units as well as between a processing unit and an external source.

Referring to FIG. 12, a router 106 includes branching units 106A and 106B, and junction units 106C and 106D.

A data packet applied to an input node IN1 is provided from either an output node OUT1 or an output node OUT2. Similarly, a data packet applied to an input node IN2 is provided from output node OUT1 or output node OUT2.

FIG. 13 is a block diagram of a conventional branching unit 106A of FIG. 12.

Referring to FIG. 13, branching unit 106A includes a branching control unit 107. Branching control unit 107 includes a C element 107A, an OR circuit 107C receiving a branching permission signal BEIN applied at an input node BE to indicate the branch destination of a data packet and a SEND signal from C element 107A, a logic gate 107D, and an AND circuit 107E receiving an ACK signal from junction units 106C and 106D shown in FIG. 12. The SEND signal is applied from output node COA to junction unit 106C, as well as from an output node COB to junction unit 106D.

To which of junction units 106C and 106D in FIG. 12 the SEND signal is to be transmitted is specified by branching permission signal BEIN. Depending upon whether branching permission signal BEIN attains an L level or H level, a SEND signal of an L level indicative of a transfer request is provided from either output node COA or output node COB.

The ACK signal indicating permission of transfer is applied to AND circuit 107E from input nodes RIA and RIB. A signal of an H level is output from AND circuit 107E in response to the ACK signals from respective branch destinations both attaining an H level representing a data transfer permitted state. The H level signal output from AND circuit 107E is applied to input node RI of C element 107A. Thus, C element 107A receives permission of data transfer.

FIG. 14 represents a specific example of C element 107A of branching control unit 107 of FIG. 13. Referring to FIG. 14, branching control unit 107 includes C element 107A. The configuration of C element 107A is similar to that of C element 101A of FIG. 11.

FIG. 15 is a waveform diagram of signals shown in FIG. 14.

Referring to FIG. 15, the operation of branching control unit 107 during time t1-t4 is similar to that of C element 101A of FIG. 9. Therefore, description thereof will not be repeated.

When ACK signals ACKIN1 and ACKIN2 both attain an H level at time t5, ACK signal ACKIN of an H level indicating transfer permission is applied to input node RI of C element 107A at time t6.

At time t9, SEND signal SNDOT1 of an L level is provided from output node COA to junction unit 106C of FIG. 12, whereby output of a data packet is initiated.

FIG. 16 is a block diagram of a conventional 1-input 4-output branching unit constituting another router.

Referring to FIG. 16, a branching unit 109 includes a C element 109A, an OR circuit 109F and logic gates 109G-109I receiving a branching permission signal applied through input nodes BEA and BEB and a SEND signal from C element 109A, and an AND circuit 109J receiving an ACK signal from respective branch destinations.

Likewise the branching control unit of FIG. 13, the transmission destination of a SEND signal is determined in accordance with a combination of the logic levels of branching permission signals applied to input nodes BEA and BEB.

The ACK signal from each branch destination applied through input nodes RIA, RIB, RIC and RID is applied to AND circuit 109J. Likewise AND circuit 107E of FIG. 13, AND circuit 109J outputs a signal of an H level in response to the ACK signals from respective branch destinations attaining an H level indicating a data transfer permitted state. C element 107A receives an ACK signal of an H level indicating permission of data transfer from AND circuit 109J.

At the conventional branching unit disclosed in Japanese Patent Laying-Open No. 2001-331472, output of a SEND signal from a C element to the branch destination will not be initiated unless all the plurality of branch destinations of data attain a data transfer permitted state.

As shown in the timing chart of FIG. 15, for example, SEND signal SNDIN attains an H level at time t3, and input of a data packet is completed. Since ACK signal ACKIN1 attains an H level at time t3, junction unit 106C of FIG. 12 attains a data input allowable state at time t3. However, since SEND signal SNDOT1 of an L level is not transmitted to junction unit 106C until time t9, transfer is not requested. Therefore, a data packet waiting state occurs at a conventional branching unit, posing the problem of data retention.

SUMMARY OF THE INVENTION

An object of the present invention is to provide a data driven type information processing apparatus and method of executing data packet transfer at higher speed in a data transmission path.

According to an aspect of the present invention, a data driven type information processing apparatus executing an operation in accordance with destination information and instruction information on a data packet including the destination information, the instruction information and data, includes: a plurality of processing circuits executing an operation upon receiving a data packet; and a transfer circuit receiving a data packet from a first one of the plurality of processing circuits to transfer the data packet to a branching destination designated by the first processing circuit among a plurality of branching destinations of the data packet that is any of the plurality of processing circuits and an external source. The transfer circuit includes a control circuit monitoring the data holding state of each branching destination to transfer the data packet to a branching destination designated by the first processing circuit independent of the data holding state of other branching destinations, when the data holding state of the designated branching destination switches from a data transfer inhibited state to a data transfer permitted state.

More preferably, the control circuit includes a request response unit, a select designation unit, and a plurality of transfer request units. The request response unit receives from the first processing circuit a first transfer request signal designating initiation of a data packet transfer to return to the first processing circuit a first transfer permission signal indicating that input of a data packet to the transfer circuit is allowed. The select designation unit receives from the request response unit completion information indicating completion of input of the data packet and monitors the data holding state of the branching destination designated by the branching destination information sent from the first processing circuit to designate initiation of a data packet transfer upon receiving a second transfer permission signal indicating that the data packet can be input from the designated branching destination. The transfer request unit sends a second transfer request signal indicating initiation of a data packet to a corresponding branching destination among the plurality of branching designations designated as the designated branching destination when designation of the select designation unit is received.

Further preferably, the select designation unit includes a plurality of designation units provided corresponding to respective branching designations, receiving completion information, branching destination information, and a second transfer permission signal to designate initiation of a data packet transfer to a corresponding transfer request unit.

According to another aspect of the present invention, a data driven type information processing method of executing an operation in accordance with destination information and instruction information on a data packet including the destination information, the instruction information and data, includes: a plurality of processing steps of executing an operation upon receiving a data packet; and a transfer step of receiving a data packet from a first one of the plurality of processing steps and transferring the data packet to a subsequent step designated by the first processing step among a plurality of subsequent steps of the data packet that is any of the plurality of processing steps and an external processing step. The transfer step includes a control step of monitoring the data holding state of each subsequent step to transfer the data packet to a subsequent step designated by the first processing step independent of the data holding state of other subsequent steps, when the data holding state of the designated subsequent step switches from a data transfer inhibited state to a data transfer permitted state.

More preferably, the control step includes a request response step, a select designation step, and a plurality of transfer request steps. In the request response step, a first transfer request signal designating initiation of a data packet transfer is received from the first processing step to return to the first processing step a first transfer permission signal indicating that input of a data packet to the transfer step is allowed. In the select designation step, completion information indicating completion of input of the data packet is received from the request response step, and the data holding state of the subsequent step designated by the branching destination information sent from the first processing step is monitored to designate initiation of a data packet transfer upon receiving a second transfer permission signal indicating that the data packet can be input from the designated subsequent step. In the transfer request step, a second transfer request signal indicating initiation of a data packet transfer is sent to a corresponding step among the plurality of subsequent steps designated as the designated subsequent step when designation of the select designation step is received.

Further preferably, the select designation step includes a plurality of designation steps, provided corresponding to respective subsequent steps, of receiving completion information, branching destination information, and the second transfer permission signal, and designating initiation of a data packet transfer to the transfer request step.

A main advantage of the present invention is that data packet transfer is carried out at higher speed without the occurrence of a data packet waiting state.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
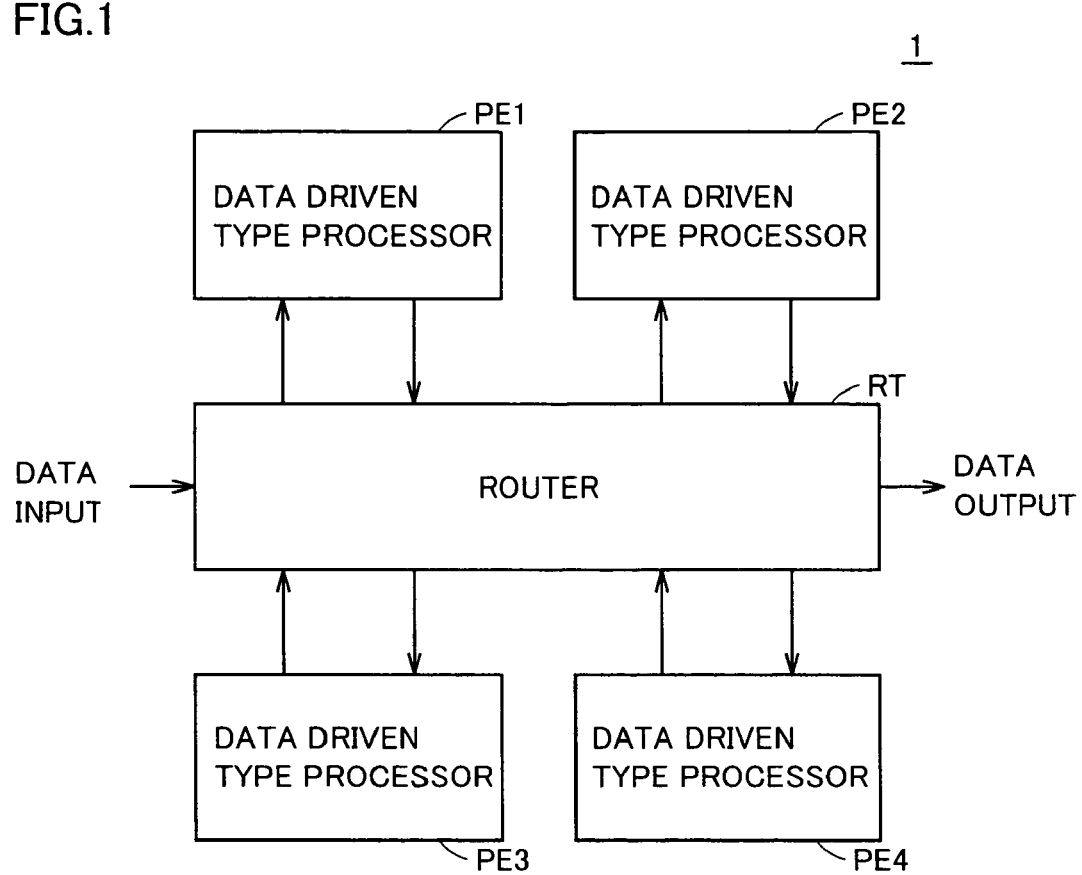
FIG. 1 is a schematic block diagram of a data driven type information processing apparatus of the present invention.

Embodiments of the present invention will be described in detail hereinafter with reference to the drawings. In the drawings, the same or corresponding elements have the same reference character allotted.

First Embodiment

Referring to FIG. 1, a data driven type information processing apparatus 1 of the present invention includes data driven type processors PE1-PE4 conducting processing operations, and a router RT. A data driven type processor is simply referred to as "processor" hereinafter.

Although four processors are shown in FIG. 1, the present invention is not limited to the number of four processors, and the number of processors are set in accordance with the required processing capability.

In the case where none of processors PE1-PE4 conduct processing of a data packet, the data packet applied to router RT is output from router RT intact. In the case where a data packet is to be transferred among processors PE1-PE4, the data packet passes through router RT.

For example, when a data packet is processed in the order of processors PE1, PE3 and PE2, the data packet is applied from router RT to processor PE1. The data packet processed at processor PE1 is applied to processor PE3 via router RT. Then, the data packet processed at processor PE3 is applied to processor PE2 via router RT. The data processed at processor PE2 is returned to router RT to be output, or to be processed again at processors PE1-PE4.

Figure 2:
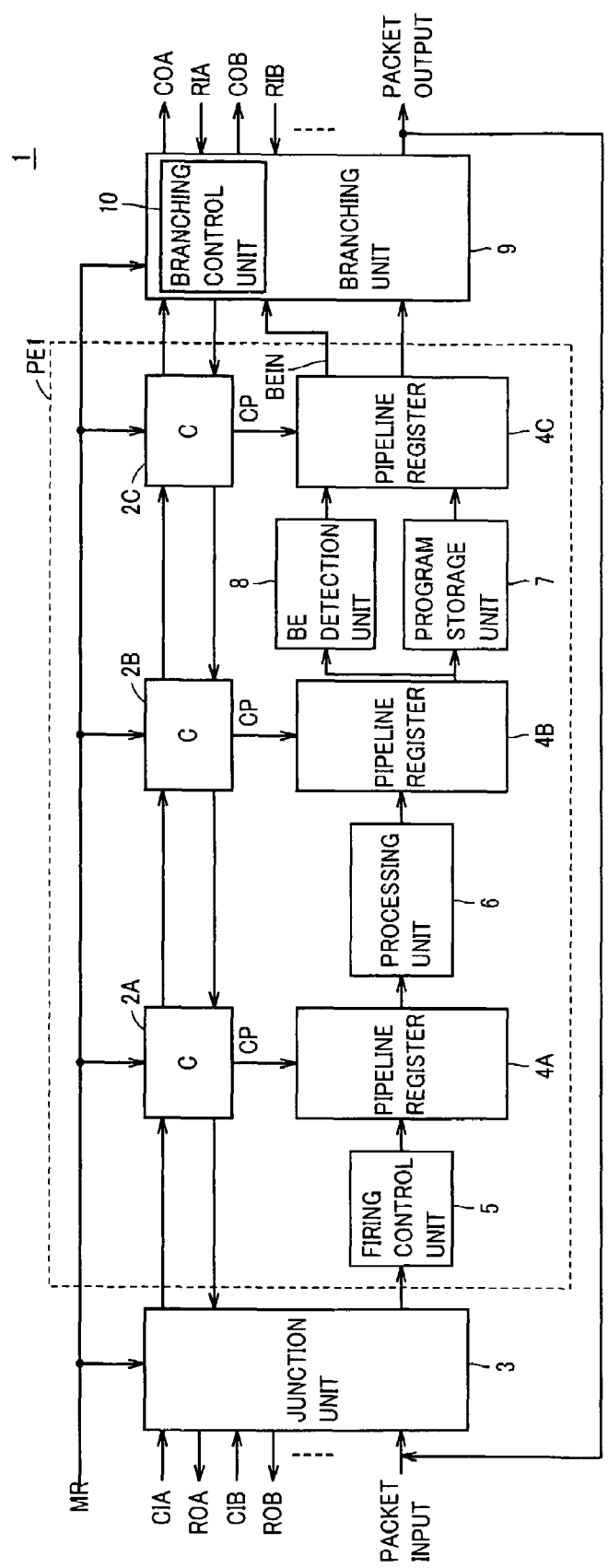
FIG. 2 is a schematic block diagram to describe a processor PE1 and a router RT.

FIG. 2 shows processor PE1 representative of processors PE1-PE4 of data driven type information processing apparatus 1. Router RT of FIG. 1 is indicated as a junction unit 3 and a branching unit 9 in FIG. 2. Junction unit 3 joins the input data packet with the data packet processed at processor PE1. Branching unit 9 directs the data packet to an external source or to junction unit 3.

Each of processors PE2-PE4 of FIG. 1 has a configuration similar to that of processor PE1. Therefore, description will be provided for only processor PE1 hereinafter, and description for the remaining processors will not be repeated.

Processor PE1 includes C elements 2A-2C that transfer data autonomously by transmitting/receiving a transfer request signal requesting a data transfer and a transfer permission signal indicating whether data transfer is permitted or not, and pipeline registers 4A-4C to input/output a data packet in accordance with a clock pulse output from each of C elements 2A-2C.

Figure 7:
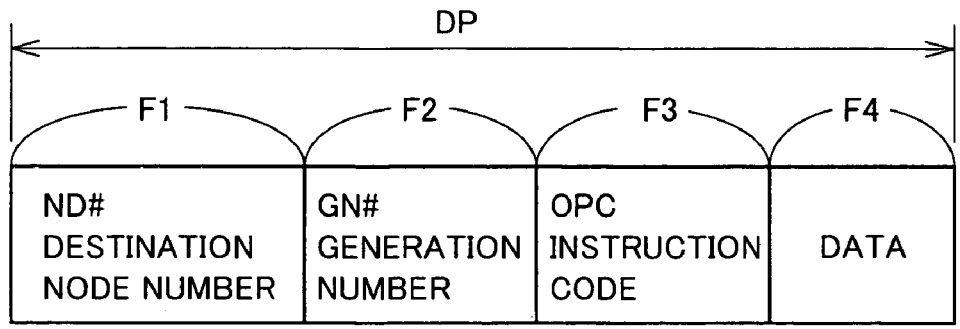
FIG. 7 represents a configuration of a data packet applied conventionally and in the present invention.
Figure 8:
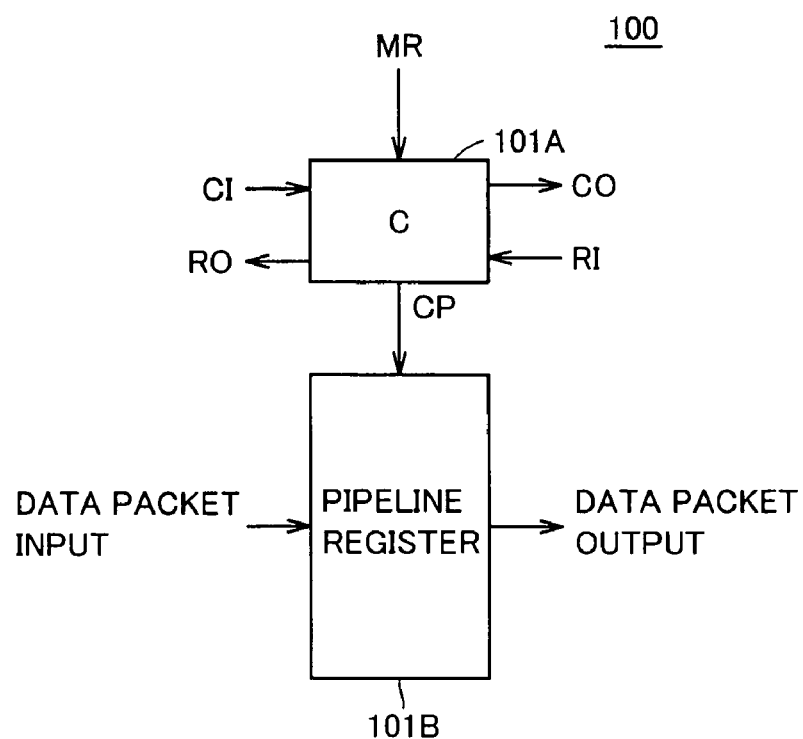
FIG. 8 represents a configuration of a data transmission path.
Figure 9:
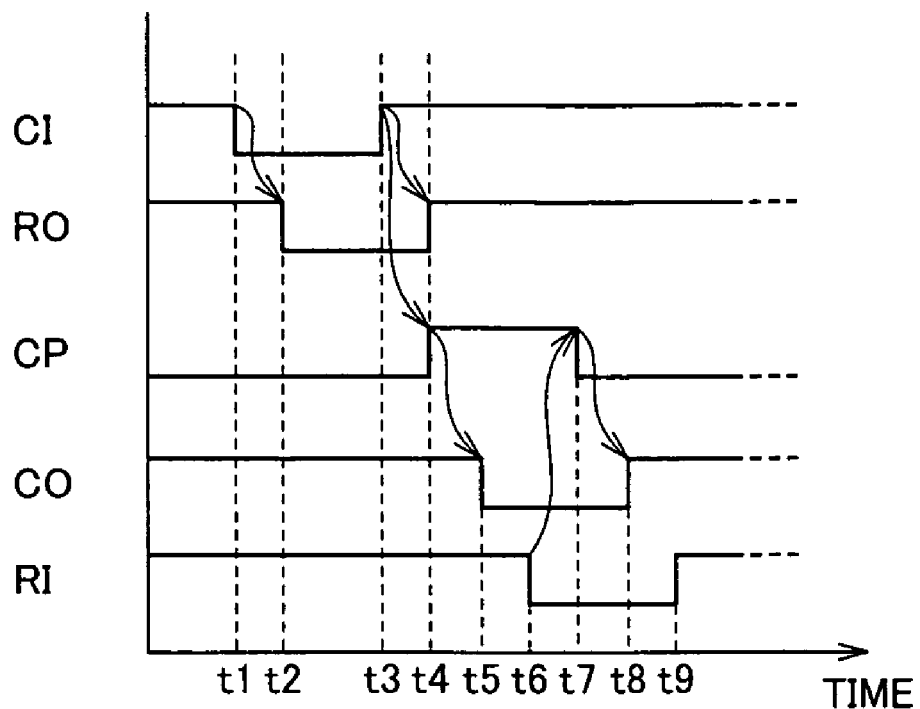
FIG. 9 is a waveform diagram of signals input to and output from respective nodes of C element 101A of FIG. 8.
Figure 10:
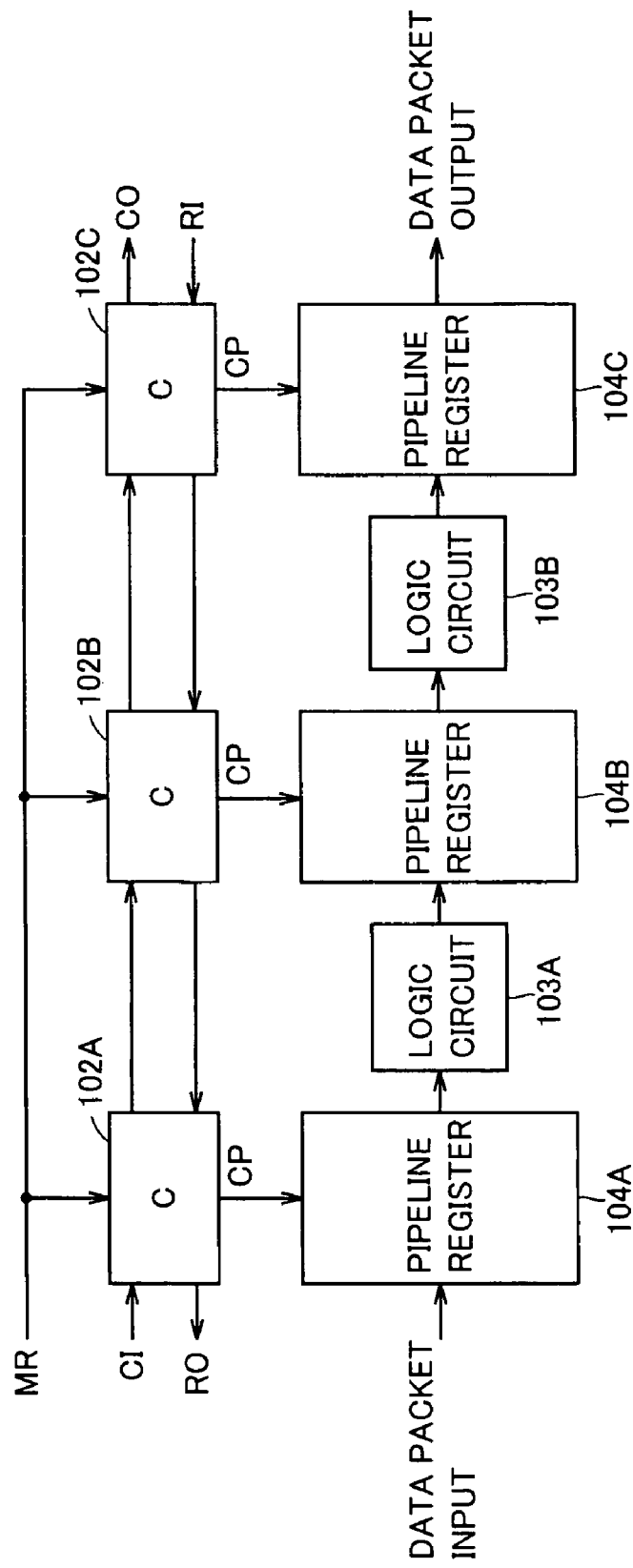
FIG. 10 represents an application example of a data transmission path in a data driven type information processing apparatus.

Processor PE1 further includes a firing control unit 5 receiving a data packet DP shown in FIG. 7 from junction unit 3 to detect two data packets with matching destination node number ND# and generation number GN# in data packet DP, and storing the data of one data packet into the data region of the other data packet when the required data is available. That other data packet is output from firing control unit 5.

Processor PE1 further includes a processing unit 6 carrying out a predetermined processing on the data in data field F4 based on an instruction code OPC included in data packet DP, and storing the result in data field F4 for output of data packet DP.

Processor PE1 further includes a program storage unit 7 obtaining from a program memory not shown information of a node to which the data packet is to be sent and an instruction code that is to be executed next based on destination node number ND# of an input data packet, and storing the obtained result in destination node number field F1 and instruction code field F3 of the data packet for output of data packet DP.

Processor PE1 further includes a BE detection unit 8 detecting a branching destination of a data packet depending upon the data packet output from pipeline register 4B. The branching destination detected at BE detection unit 8 is provided to branching unit 9 via pipeline register 4C as a branching permission signal BEIN.

Branch unit 9 includes a branching control unit 10 receiving a data packet by transferring a SEND signal and an ACK signal with respect to C element 2C, and providing a data packet output by transferring a SEND signal and an ACK signal with respect to junction unit 3.

The data packet is output from branching unit 9 to an external source or to junction unit 3. The data packet applied to junction unit 3 is sent to processor PE1 again.

For the purpose of convenience, the external source or junction unit 3 that is the output destination of the data packet from branching unit 9 is referred to as "branching destination" hereinafter.

Figure 3:
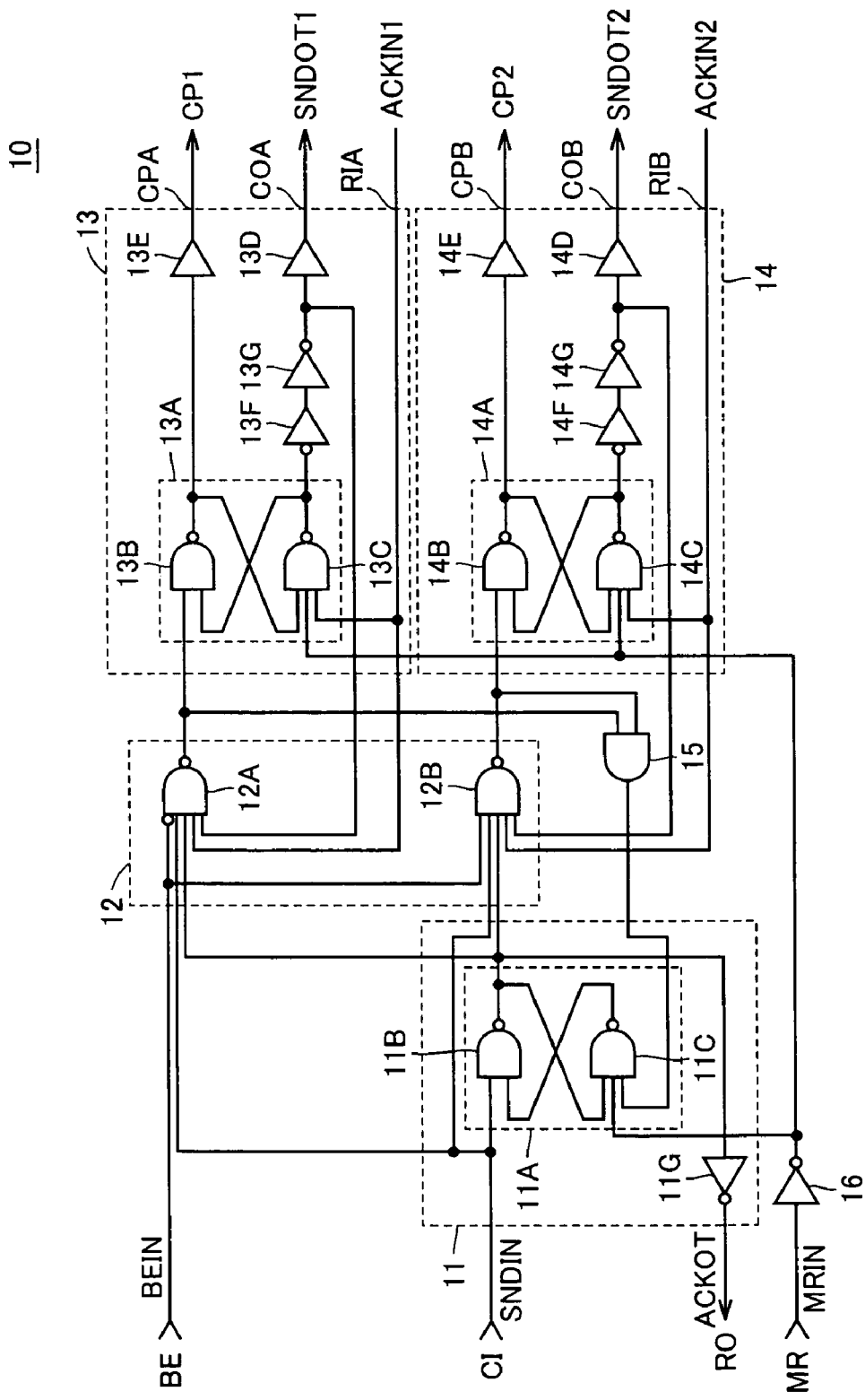
FIG. 3 is a circuit diagram of a branching control unit 10 according to a first embodiment.

Branching control unit 10 according to the first embodiment shown in FIG. 3 allows data transfer independent of the data holding state of other branching destinations if the branching destination among the plurality of branching destinations to which a data packet is to be transferred is in a data input permitted state.

Referring to FIG. 3, branching control unit 10 includes a request response unit 11 receiving SEND signal SNDIN from input node CI and providing ACK signal ACKOT from output node RO.

Request response unit 11 includes a flip-flop 11A receiving SEND signal SNDIN of an L level to be set and receiving a master reset signal MIN to be reset, and an inverter 11G receiving and inverting the logic level of a signal output from flip-flop 11A when flip-flop 11A is set to provide the inverted signal as ACK signal ACKOT from output node RO.

Flip-flop 11A includes a NAND circuit 11B receiving SEND signal SNDIN, and a NAND circuit 11C receiving an inverted version of master reset signal MRIN.

Branching control unit 10 further includes a select designation unit 12 receiving from flip-flop 11A a signal of an L level indicating that input of a data packet to branching unit 9 of FIG. 2 has been completed (this signal is input to inverter 11G and output as ACK signal ACKOT), and upon receiving an ACK signal of an H level indicating transfer permission from the branching designation selected by branching permission signal BEIN, designating transmission of a SEND signal to the selected branching destination.

Select designation unit 12 includes a logic gate 12A rendered active when branching permission signal BEIN is at an L level to output a signal of an L level, and a NAND circuit 12B rendered active when branching permission signal BEIN is at an H level to output a signal of an L level.

Branch control unit 10 further includes a transfer request unit 13 sending SEND signal SNDOT1 to the C element of one branching designation, and receiving ACK signal ACKIN1 from the C element of that branching destination.

Transfer request unit 13 includes a flip-flop 13A set upon receiving a signal of an L level from logic gate 12A, and reset by a signal that is an inverted version of master reset signal MIN or an ACK signal ACKIN1.

Transfer request unit 13 further includes a delay circuit 13E to delay a clock pulse CP1 to designate output of a data packet to a pipeline register not shown when flip-flop 13A is set.

Transfer reset unit 13 further includes inverters 13F and 13G and a delay circuit 13D to delay signal SNDOT1 that is output when flip-flop 13A is reset.

Flip-flop 13A includes a NAND circuit 13B receiving the output from logic gate 12A, and a NAND circuit 13C receiving ACK signal ACKIN1 and a signal that is an inverted version of signal MRIN.

Branching control unit 10 further includes a transfer request unit 14 providing SEND signal SNDOT2 to the C element of the other branching designation, and receiving ACK signal ACKIN2 from the C element of that other branching destination to designate output of a data packet to a pipeline register not shown.

Transfer request unit 14 has a configuration similar to that of transfer request unit 13. Therefore, a description thereof will not be repeated.

Branching control unit 10 further includes an AND circuit 15 providing a signal output of an H level to reset flip-flop 11A when both the outputs of logic gate 12A and NAND circuit 12B are at an H level. Both logic gate 12A and NAND circuit 12B providing outputs of an H level correspond to the state where the C element of the preceding stage is requesting a transfer (SEND signal SNDIN at an L level).

Branching control unit 10 further includes an inverter 16 inverting the logic level of master reset signal MRIN required to initialize branching control unit 10, and providing the inverted output to flip-flops 11A, 13A and 14A.

Branching control unit 10 of FIG. 3 will be described hereinafter in comparison with conventional branching control unit 106A of FIG. 14.

Figure 11:
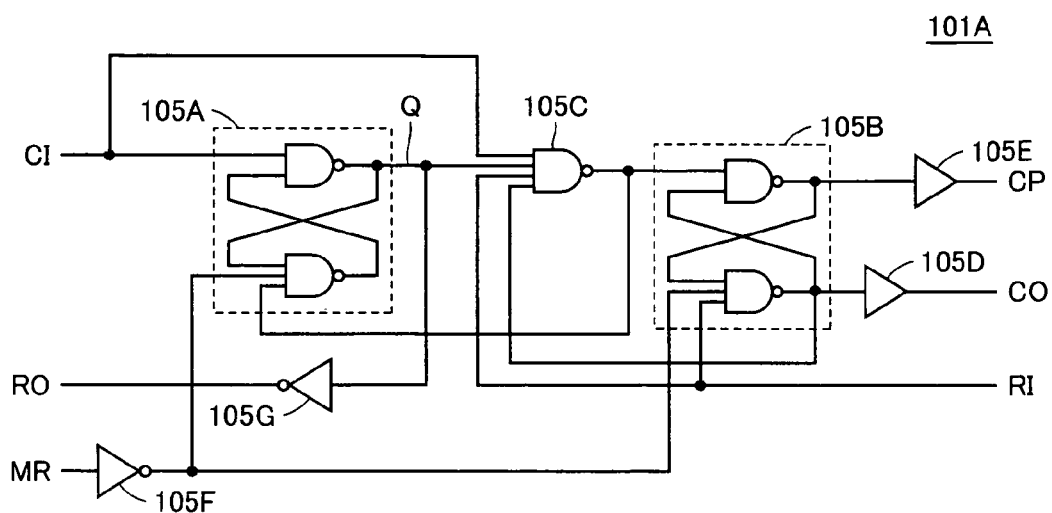
FIG. 11 is a specific circuit diagram of C element 101A.
Figure 12:
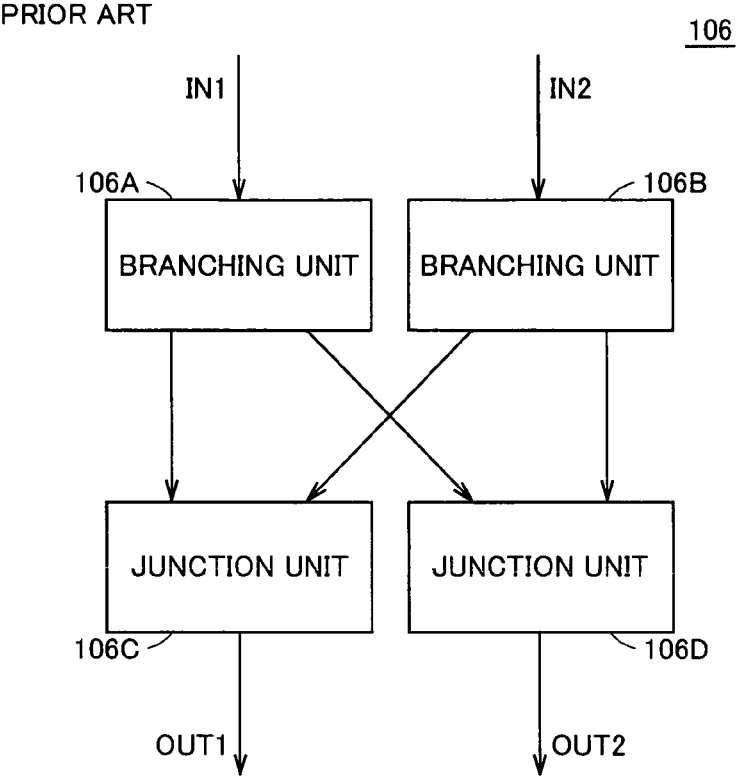
FIG. 12 is a block diagram of a 2-input 2-output router employed in a data driven type information processing apparatus of conventional art and the present invention.
Figure 13:
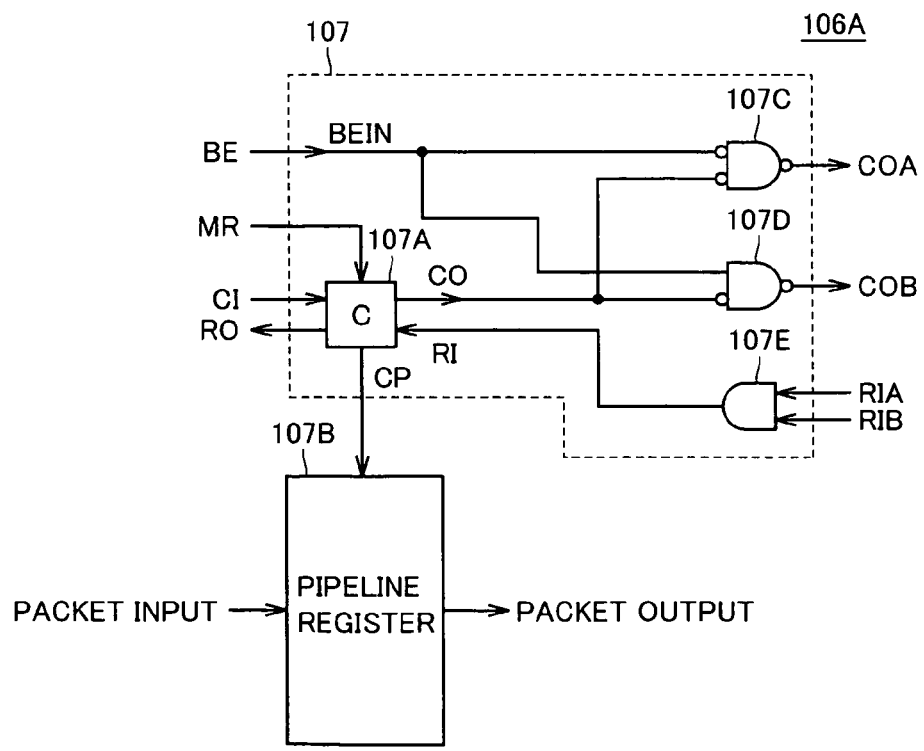
FIG. 13 is a block diagram of a conventional branch unit 106A of FIG. 12.
Figure 14:
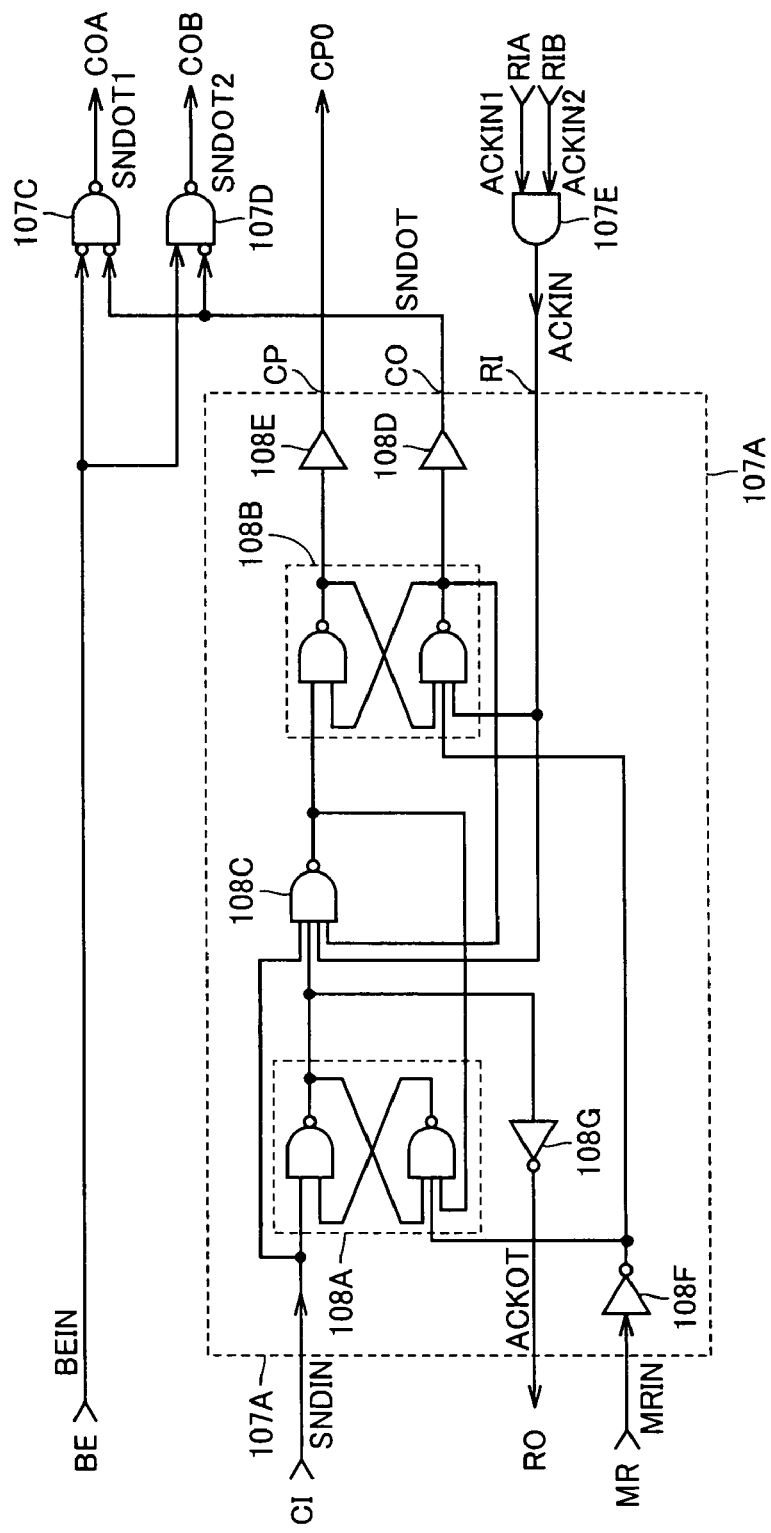
FIG. 14 represents a more detailed specific example of C element 107A of branching control unit 107 of FIG. 13.
Figure 15:
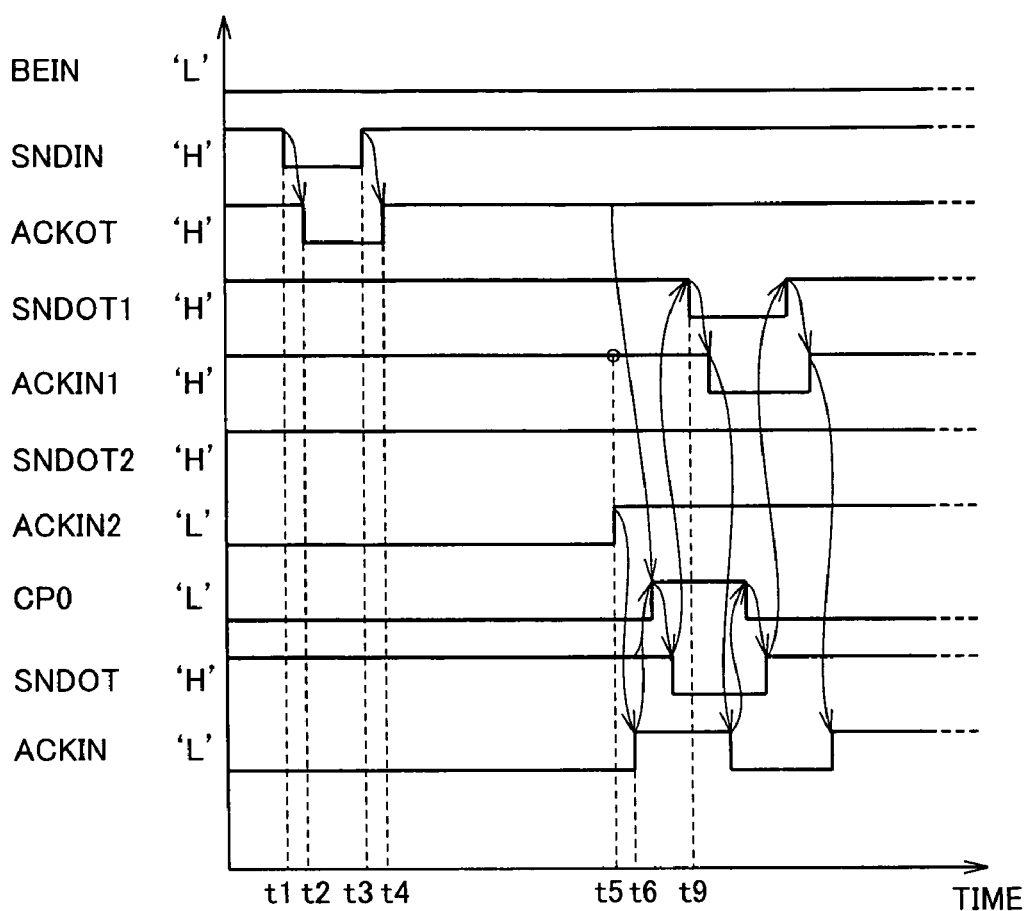
FIG. 15 is a waveform diagram of signals of FIG. 14.
Figure 16:
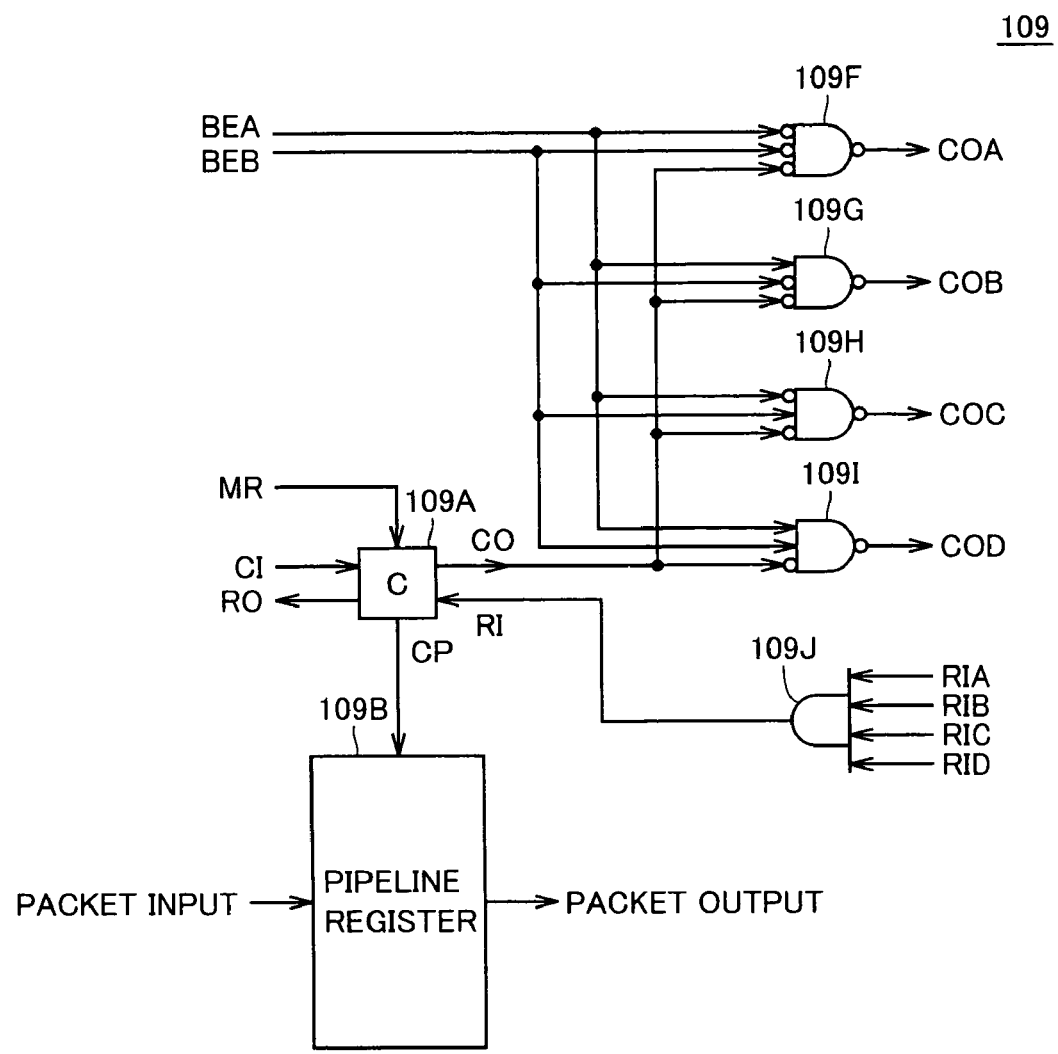
FIG. 16 is a block diagram of a conventional 1-input 4-output branch unit constituting another router.

In branching control unit 106A of FIG. 14, C element 107A has a configuration identical to that of the C element of FIG. 11. C element 107A requests a transfer by sending a signal from flip-flop 108B and delay circuit 108D with respect to a branching destination. It is to be noted that C element 107A cannot designate the branching designation to which transfer is to be requested. Therefore, the transfer request to a different branching destination can be effected by applying a branching permission signal BEIN and a SEND signal SNDOT to OR circuit 107C and logic gate 107D, and providing a signal from one of OR circuit 107C and logic gate 107D.

In order to input the transfer permission sent from each branching designation to C element 107A, only one ACK signal indicating transfer permission from each branching designation must be used. In FIG. 14, ACK signals ACKIN1 and ACKIN2 are applied to AND circuit 107A, and the result of the logical product of AND circuit 107E is applied to C element 107A. As mentioned before, a signal ACKIN of an L level cannot be input to C element 107A unless all ACK signals ACKIN1 and ACKIN2 attain an H level.

Although an output designation can be specified to request a transfer at branching control unit 106A of FIG. 14, information of the data holding state of each branching designation that is the input source cannot be separated from the transfer permission received from each branching designation.

In contrast, branching control unit 10 of FIG. 3 includes logic gate 12A and NAND circuit 12B that can receive a transfer permission for each branching designation. Branching control unit 10 further includes transfer request units 13 and 14 receiving respective outputs of logic gate 12A and NAND circuit 12B. Transfer request units 13 and 14 effect a data transfer request to the branching designation when one of logic gate 12A and NAND circuit 12B is rendered active. Since transfer permission can be received for each branching designation to effect a transfer request, a data waiting state depending upon the data holding state of another branching designation will no longer occur.

Logic gate 12A and NAND circuit 12B have their activation specified with respect to the transfer permission from each branching designation in accordance with branching permission signal BEIN. In other words, logic gate 12A and NAND circuit 12B serve to monitor the data input enable state of each branching designation.

Figure 4:
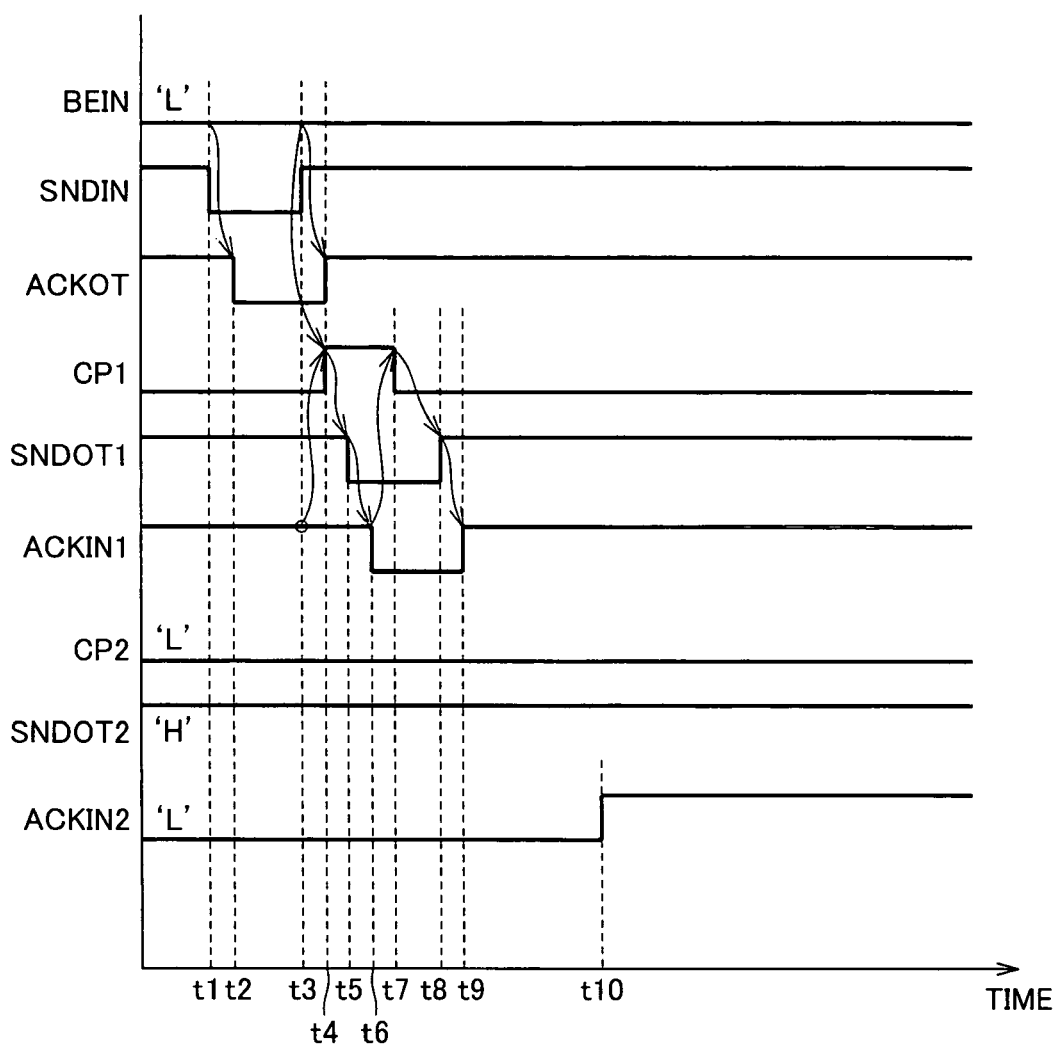
FIG. 4 is a timing chart representing an operation of branching control unit 10 of FIG. 3.

Branching control unit 10 of the first embodiment will be described in further detail hereinafter with reference to the timing chart of FIG. 4.

Prior to time t1, branching control unit 10 is initialized. Master reset signal MRIN is input from input node MR. Master reset signal MIN is not indicated in FIG. 4.

Branching control unit 10 is initialized by the reset of flip-flops 11A, 13A and 14A through master reset signal MRIN.

Branching permission signal BEIN has a logic level of an L level. In other words, branching control unit 10 is set so as to output a SEND signal SNDOT1 of an L level from output node COA.

By the initialization, the ACK signal ACKIN1 attains an H level indicating that the transfer request from the C element of the preceding stage is permitted prior to time t1. Furthermore, since SEND signals SNDOT1 and SNDOT2 both attain an H level, branching control unit 10 does not request a transfer to any branching designation.

At time t1, SEND signal SNDIN attains a logic level of L representing a transfer request, whereby a data packet is transferred from the C element of the preceding stage.

At time t2, ACK signal ACKOT of an L level is output in response to flip-flop 11A being set. Specifically, when a data transfer is requested from the C element of the preceding stage, branching control unit 10 designates inhibition of further data transfer to the C element of the preceding stage.

At time t3, SEND signal SNDIN applied to input node CI attains an H level, whereby input of the data packet is completed.

When SEND signal SNDIN attains an H level at time t3, ACK signal ACKOT is pulled up to an H level at time t4. In other words, branching control unit 10 notifies the C element of the preceding stage of returning to a transfer permitted state.

In response to ACK signal ACKIN1 attaining an H level and SEND signal SNDIN attaining an H level at time t3, flip-flop 13A of FIG. 3 is set at time t4. In response, a clock pulse CP1 of an H level is output. In other words, a data packet can be output from the pipeline register.

When clock pulse CP1 attains an H level at time t4, SEND signal SNDOT1 is pulled down to an L level at time t5. In other words, transfer is requested to one branching destination, and a data packet is output from the pipeline register.

At time t6, ACK signal ACKIN attains an L level indicating inhibition of further data transfer. In response, flip-flop 13A of FIG. 3 is reset.

At time t7, clock pulse CP1 attains an L level, whereby output of a data packet from the pipeline register is completed.

At time t8, SEND signal SNDOT1 attains an H level in response to an L level of clock pulse CP1, whereby transfer of a data packet to one branching designation ends.

At time t9, ACK signal ACKIN1 is pulled up to an H level. In other words, the data packet stored in the pipeline register of the succeeding stage is output, and branch control unit 10 is notified of one branching designation attaining a transfer permitted state.

At time t10, ACK signal ACKIN2 from the other branching designation is pulled up to an H level. In other words, the other branching designation attains a data transfer permitted state.

At time t10, output of a data packet to one branching designation is already completed. In other words, output of a data packet does not depend on the data holding state of the other branching designation. Therefore, a data packet can be transferred without occurrence of a waiting state.

Second Embodiment

Figure 5:
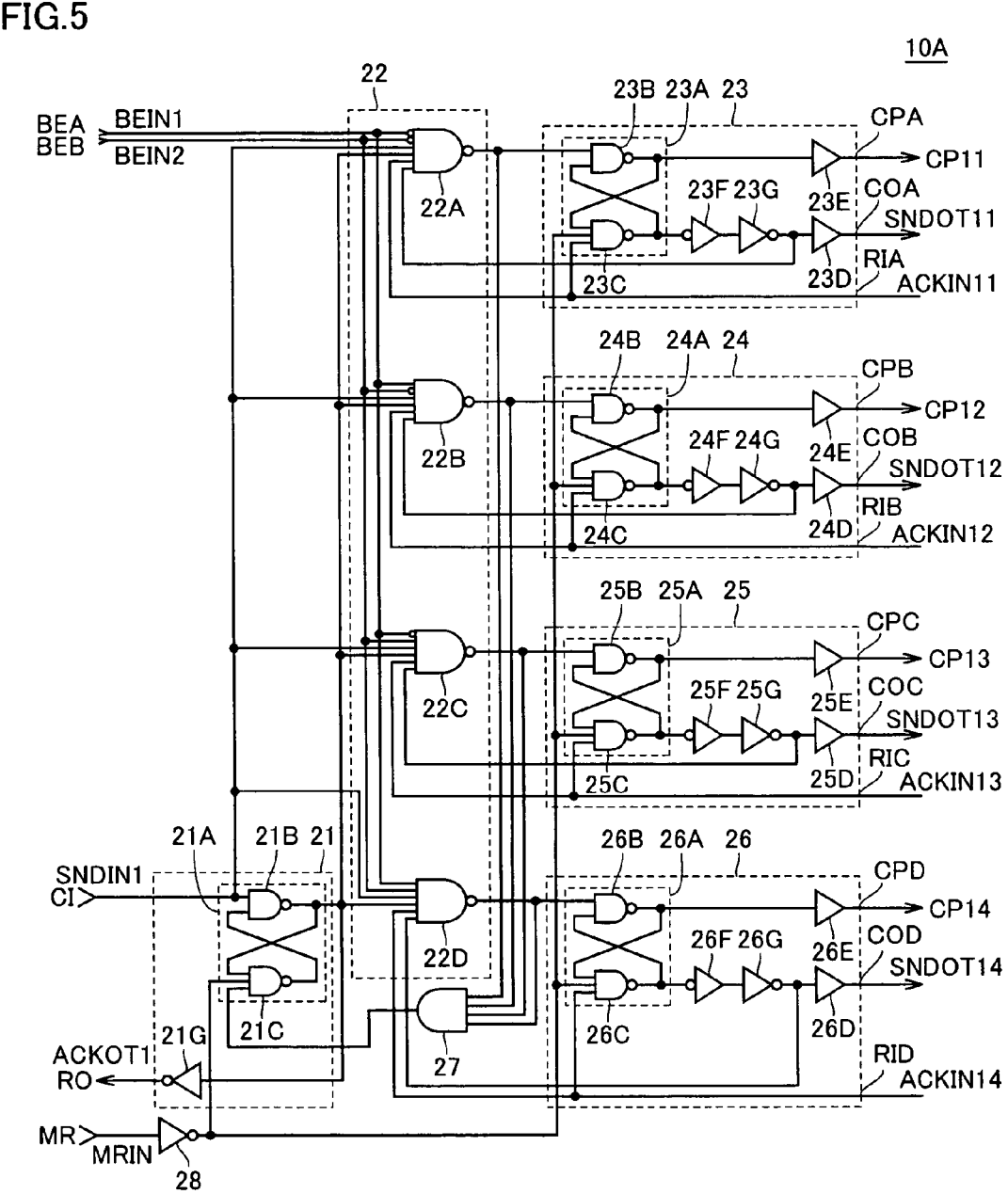
FIG. 5 is circuit diagram of a branching control unit 10A according to a second embodiment.

FIG. 5 is a circuit diagram of a branching control unit 10A according to a second embodiment.

Branching control unit 10A is a 1-input 4-output branching unit. Likewise branching control unit 10 of FIG. 3, branching control unit 10A of the second embodiment can transfer data independent of the data holding state of other branching designations, even in the case where there are four branching designations, if the branching designation to which the data packet is to be transferred attains a data input enable state.

Referring to FIG. 5, branching control unit 10A includes a request response unit 21 receiving SEND signal SNDIN1 from the C element of the preceding stage to return ACK signal ACKOT1.

Request response unit 21 has a configuration similar to that of request response unit 11 of FIG. 3. Therefore, description of the configuration of request response unit 11 will not be repeated.

Branching control unit 10A further includes a select designation unit 22 receiving from flip-flop 21A a signal of an L level indicating that input of a data packet to branching unit 9 of FIG. 2 has been completed (this signal is applied to inverter 21G and output as ACK signal ACKOT1) to designate transmission of a SEND signal to the branching designation upon receiving an ACK signal of an H level indicative of transfer permission from the branching designation selected by branching permission signals BEIN1 and BEIN2.

Select designation unit 22 includes logic gates 22A-22C and a NAND circuit 22D rendered active by a combination of the logic levels of branching permission signals BEIN1 and BEIN2 to output a signal of an L level.

Branching control unit 10A further includes transfer request units 23-26 transmitting a SEND signal to each branching designation, and receiving an ACK signal from the branching designation to which a SEND signal was transmitted.

Transfer request units 23-26 have a configuration similar to that of transfer request unit 13 of FIG. 3. Therefore, description thereof will not be repeated.

Branching control unit 10A further includes an AND circuit 27 providing a signal of an H level to reset flip-flop 21A when all the outputs of logic gates 22A-22C and NAND circuit 22D are at an H level. Logic gates 22A-22C and NAND circuit 22D providing an output of an H level correspond to the state where the C element of the preceding stage requests a transfer (SEND signal SNDIN1 at an L level), likewise branching control unit 10 of FIG. 3.

Branching control unit 10A further includes an inverter 28 to invert the logic level of master reset signal MIN required, to initialize branching control unit 10A, and provide the inverted output to flip-flops 21A, 23A, 24A, 25A, and 26A.

Branching control unit 10A of the second embodiment will be described here. The branching designation of a data packet is determined in accordance with a combination of the logic levels of branching permission signals BEIN1 and BEIN2. Likewise branching control unit 10 of FIG. 3, branching control unit 10A includes logic gates 22A-22C and a NAND circuit 22D receiving an ACK signal corresponding to each branching designation. Branching control unit 10A includes transfer request units 23-26 receiving respective outputs of logic gates 22A-22C and NAND circuit 22D to output a SEND signal required to request a data transfer to a branching designation when any of logic gates 22A-22C and NAND circuit 22D is rendered active. Likewise branching control unit 10 of FIG. 3, a data waiting state depending upon the data holding state of another branching designation will no longer occur since the input of an ACK signal and the output of a SEND signal can be effected for each branching designation.

The branching designation of a data packet is determined in accordance with a combination of the logic levels of branching permission signals BEIN1 and BEIN2.

At branching control unit 10A of FIG. 5, logic gate 22A is rendered active when branching permission signals BEIN1 and BEIN2 are both at an L level, whereby flip-flop 23A is set to output SEND signal SNDOT11 of an L level.

Similarly, when branching permission signal BEIN1 is at an H level and branching permission signal BEIN2 is at an L level, logic gate 22B is rendered active to output a signal of an L level, whereby flip-flop 24A is set. SEND signal SNDOT12 of an L level is output from flip-flop 24A.

Similarly, when branching permission signal BEIN1 is at an L level and branching permission signal BEIN2 is at an H level, logic gate 22C is rendered active to output a signal of an L level, whereby flip-flop 25A is set. SEND signal SNDOT13 of an L level is output from flip-flop 25A.

Similarly, when both branching permission signals BEIN1 and BEIN2 are at an H level, NAND circuit 22D is rendered active to output a signal of an L level, whereby flip-flop 26A is set to output SEND signal SENDOT14 of an L level.

Figure 6:
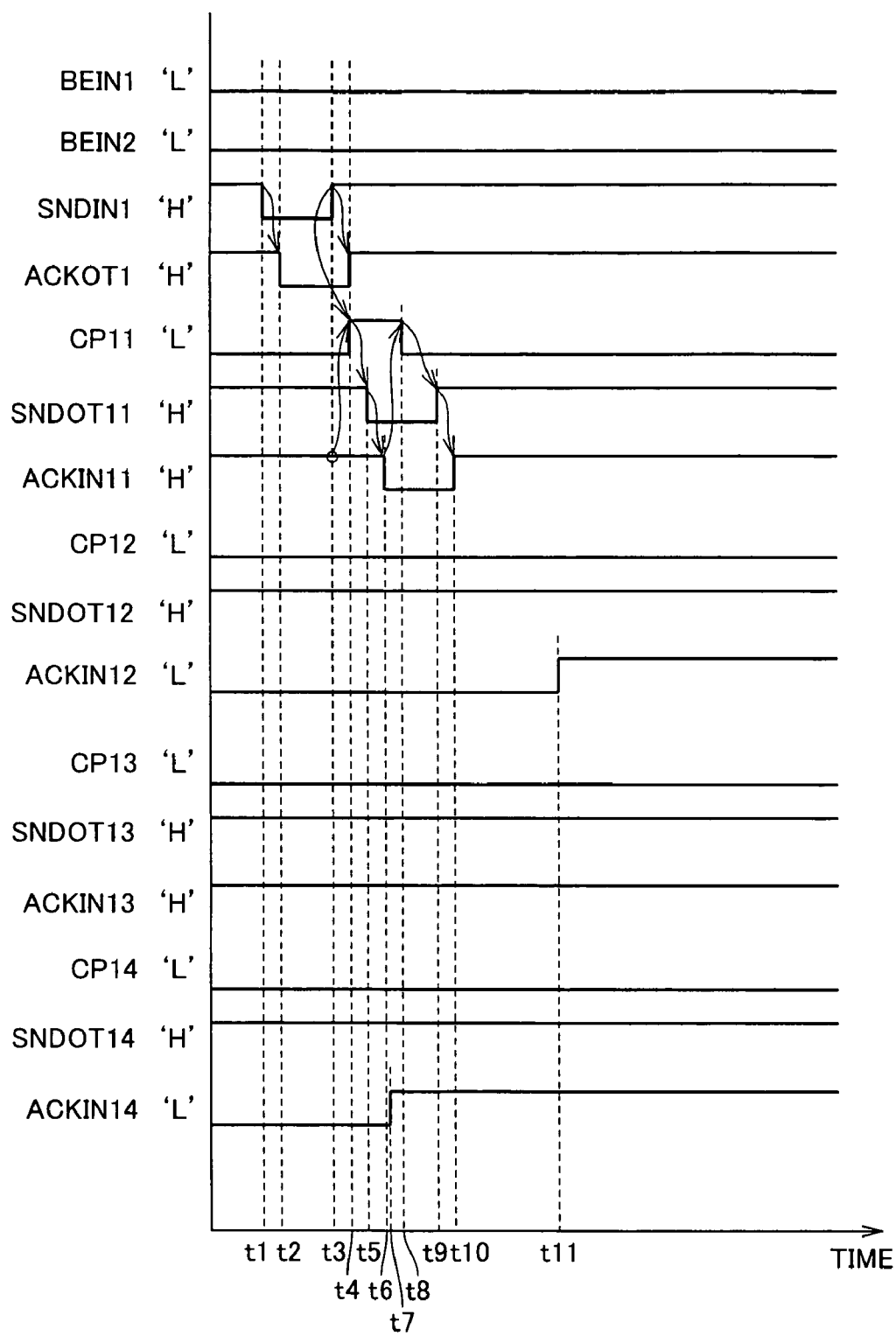
FIG. 6 is a timing chart representing an operation of branching control unit 10A of FIG. 5.

Branching control unit 10A of the second embodiment will be described in further detail hereinafter with reference to the timing chart of FIG. 6.

Prior to time t1, branch control unit 10A is initialized. The initialization operation prior to time t1 is similar to that in the timing chart of FIG. 4. Therefore, description thereof will not be repeated.

Branching permission signals BEIN1 and BEIN2 both attain the logic level of L. In other words, branching control unit 10A is set so as to provide SEND signal SNDOT11 from output node COA.

Upon initialization, ACK signal ACKOT1 output from output node RO attains an H level. In other words, branching control unit 10A permits a transfer request received from the C element of the preceding stage. Initialization also causes all SEND signals SNDOT11-SNDOT14 to attain the logic level of an H level. In other words, branching control unit 10A does not request a transfer to any of the branching designations.

At time t1-t4, a SEND signal of an L level indicative of a data transfer request is received from the C element of the preceding stage, and branching control unit 10A designates inhibition of further data transfer to the C element of the preceding stage. The operations of branching control unit 10A during time t1-t4 is similar to that of branching control unit 10A during time t1-t4 of FIG. 2. Therefore, description thereof will not be repeated.

At time t4, ACK signal ACKOT1 attains an H level in response to SEND signal SNDIN1 attaining an H level at time t3. Branching control unit 10A notifies the C element of the preceding stage of returning to a transfer permitted state.

In response to the ACK signal ACKIN11 attaining an H level and the SEND signal SNDIN1 attaining an H level at time t3, flip-flop 23A of FIG. 5 is set at time t4. In response to flip-flop 23A being set, a clock pulse CP11 of an H level is output. In other words, the data packet can be output from the pipeline register.

When clock pulse CP11 attains an H level at time t4, SEND signal SNDOT11 is pulled down to an L level at time t5. In other words, a transfer is requested to the specified branching designation, and the data packet is output from the pipeline register.

At time t6, the ACK signal ACKIN11 attains an L level indicative of inhibition of further data transfer. In response, flip-flop 23A is reset.

At time t8, clock pulse CP11 attains an L level. Output of a data packet from the pipeline register is completed.

At time t9, SEND signal SNDOT11 attains an H level in response to clock pulse CP11 pulled down to an L level. Transfer of a data packet to the specified branching designation ends.

At time t10, ACK signal ACKIN11 is driven to an H level. In other words, the data packet stored in the pipeline register of the succeeding stage is output, and branching control unit 10A is notified of the specified branching designation attaining a transfer permitted state again.

With regards to the ACK signal representing the data holding state of other branching designations, ACK signal ACKIN13 is always at an H level from time t1 onward. ACK signal ACKIN12 attains an H level at time t11. ACK signal ACKIN14 attains an H level at time t7. In other words, the allowed timing of a data packet input differs for each branching designation.

Even though the timing of the ACK signal attaining an H level from each branching designation differs, a data packet can be transferred in response to the ACK signal of the relevant branching designation attaining an H level. Therefore, a data transfer waiting state will not occur.

The branching control unit of the present invention is not limited to an application in which the branching designations is two or four, as shown in FIGS. 3 and 5, respectively. The branching control unit of the present invention can accommodate further increase in the number of branching designations, as set forth below.

When the number of branching designations increases, the signal transmission line through which a branching permission signal is transmitted is added to the branching control unit. Accordingly, more branching designations can be specified in accordance with a combination of the logic level of branching permission signals.

Logic gates for receiving a branching permission signal and an ACK signal from the additional branching designation (corresponding to logic gates 22A-22C and NAND gate 22D in FIG. 5) are also added in accordance with the additional branching designations.

Furthermore, a transfer request unit of a configuration similar to that of transfer request unit 23 of FIG. 5 is added. The number of such added transfer request units corresponds to the number of branching designations.

With regards to the AND circuit receiving a branching permission signal and an output of the logic gate receiving the ACK signal from the additional branching designation (corresponding to AND circuit 27 of FIG. 5), an AND circuit having inputs corresponding to the number of the logic gates is employed.

Thus, the branching control unit of the present invention can readily accommodate the case where the number of branching designations is increased.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven type information processing apparatus executing an operation in accordance with destination information and instruction information on a data packet including said destination information, said instruction information, and data, comprising:
   a plurality of processing circuits executing an operation on said data based on said instruction information upon receiving said data packet, and
   a transfer circuit receiving said data packet from a first one of said plurality of processing circuits to transfer said data packet to a branching destination designated by said first processing circuit among a plurality of branching destinations of said data packet that is any of said plurality of processing circuits and an external source,
   wherein said transfer circuit comprises a control circuit monitoring a data holding state of each said branching destination based on control signals received for each respective branching destination, the transfer circuit transferring said data packet to a branching destination designated by said first processing circuit independent of said data holding state of other branching destination when a control signal of said control signals indicates that said data holding state of said designated branching destination has switched from a data transfer inhibited state to a data transfer permitted state.

2. The data driven type information processing apparatus according to claim 1, wherein said control circuit comprises
   a request response unit receiving from said first processing circuit a first transfer request signal designating initiation of transfer of said data packet to return to said first processing circuit a first transfer permission signal indicating that said data packet can be input to said transfer circuit,
   a select designation unit receiving from said request response unit completion information indicating completion of input of said data packet to monitor said data holding state at said designated branching destination by branching destination information sent from said first processing circuit, and designating initiation of transfer of said data packet upon receiving a second transfer permission signal indicating that said data packet can be input from said designated branching destination, and
   a plurality of transfer request units sending a second transfer request signal indicating initiation of transfer of said data packet to a corresponding branching destination among said plurality of branching destinations designated as said designated branching destination when designation of said select designation unit is received.

3. The data driven type information processing apparatus according to claim 2, wherein said select designation unit includes a plurality of designation units provided corresponding to respective branching destinations, receiving said completion information, said branching destination information, and said second transfer permission signal to designate initiation of transfer of said data packet to a corresponding transfer request unit.

4. A data driven type information processing method of executing an operation in accordance with destination information and instruction information on a data packet including said destination information, said instruction information, and data, said method comprising:
   a plurality of processing steps of executing an operation on said data based on said instruction information upon receiving said data packet, and
   a transfer step of receiving said data packet from a first one of said plurality of processing steps and transferring said data packet to a subsequent step designated by said first processing step among a plurality of subsequent steps of said data packet that is any of said plurality of processing steps and an external processing step,
   wherein said transfer step comprises a control step of monitoring a data holding state of each said subsequent step, based on control signals received for each respective subsequent step among the plurality of subsequent steps, to transfer said data packet to a subsequent step designated by said first processing step independent of said data holding state of other subsequent steps when a control signal of said control signals indicates that said data holding state of said designated subsequent step has switched from a data transfer inhibited state to a data transfer permitted state.

5. The data driven type information processing method according to claim 4, wherein said control step includes
   a request response step of receiving from said first processing step a first transfer request signal designating initiation of transfer of said data packet and returning to said first processing step a first transfer permission signal indicating that said data packet can be input to said transfer step,
   a select designation step of receiving completion information indicating completion of input of said data packet from said request response step to monitor said data holding state at said designated subsequent step by branching destination information sent from said first processing step, and designating initiation of transfer of said data packet upon receiving a second transfer permission signal indicating that said data packet can be input from said designated subsequent step, and a plurality of transfer request steps of sending a second transfer request signal indicating initiation of transfer of said data packet to a corresponding subsequent step among said plurality of subsequent steps designated as said designated subsequent step when designation of said select designation step is received.

6. The data driven type information processing method according to claim 5, wherein said select designation step includes a plurality of designation steps, provided corresponding to respective subsequent steps, of receiving said completion information, said branching destination information, and said second transfer permission signal, and designating initiation of transfer of said data packet to a corresponding transfer request step.

* * * * *